(12) United States Patent
Huttner et al.

(10) Patent No.: US 11,253,938 B2
(45) Date of Patent: Feb. 22, 2022

(54) DEVICE AND METHOD FOR PRODUCING A BLADE AIRFOIL

(71) Applicant: MTU Aero Engines AG, Munich (DE)

(72) Inventors: Roland Huttner, Jesenwang (DE); Xaver Breitsameter, Schiltberg (DE)

(73) Assignee: MTU AERO ENGINES AG, Munich (DE)

( * ) Notice: Subject to any disclaimer, the term of this patent is extended or adjusted under 35 U.S.C. 154(b) by 424 days.

(21) Appl. No.: 15/255,648

(22) Filed: Sep. 2, 2016

(65) Prior Publication Data

US 2017/0066071 A1 Mar. 9, 2017

(30) Foreign Application Priority Data

Sep. 3, 2015 (DE) .......................... 102015216844.1

(51) Int. Cl.
| | |
|---|---|
| *B23H 9/10* | (2006.01) |
| *B23H 3/10* | (2006.01) |
| *B23H 3/00* | (2006.01) |
| *F01D 5/14* | (2006.01) |
| *F01D 5/34* | (2006.01) |
| *B23H 3/04* | (2006.01) |

(52) U.S. Cl.
CPC .................. *B23H 9/10* (2013.01); *B23H 3/00* (2013.01); *B23H 3/10* (2013.01); *F01D 5/143* (2013.01); *F01D 5/34* (2013.01); *B23H 3/04* (2013.01); *B23H 2300/10* (2013.01); *F05D 2230/11* (2013.01)

(58) Field of Classification Search
CPC ... B23H 9/10; B23H 3/00; B23H 3/10; B23H 3/04; B23H 2300/10; F01D 5/34; F01D 5/143; F05D 2230/11
See application file for complete search history.

(56) References Cited

U.S. PATENT DOCUMENTS

| | | | |
|---|---|---|---|
| 3,849,273 A | 11/1974 | Johnson et al. | |
| 3,970,538 A | 7/1976 | Lucas | |
| 4,256,555 A | 3/1981 | Wilson et al. | |
| 4,851,090 A | 7/1989 | Bruns et al. | |
| 8,801,906 B2 | 8/2014 | Platz et al. | |
| 2005/0247569 A1* | 11/2005 | Lamphere | B23H 1/022 205/663 |

(Continued)

FOREIGN PATENT DOCUMENTS

| | | |
|---|---|---|
| CN | 103521861 A | 1/2014 |
| DE | 102009032563 A1 | 1/2011 |

*Primary Examiner* — Louis J Rufo
(74) *Attorney, Agent, or Firm* — Abel Schillinger, LLP

(57) ABSTRACT

A device and a method for producing a blade airfoil from a workpiece which comprises at least two gaps and at least one blank arranged between the two gaps, wherein the blank comprises two opposite lateral faces which are bounded by a base, a top and a first and a second edge. The method comprises:
(a) arranging the first and second electrodes in the first and second gaps, the surface of the workpiece forming an annular space surface at the gaps,
(b) applying a positive voltage to the blank and applying a negative voltage to the first and second electrodes,
(c) moving the first and second electrode in the direction of the first and second lateral faces.
Step (b) is preceded by passing electrolyte between the two electrodes over the top toward the base.

12 Claims, 3 Drawing Sheets

(56) References Cited

U.S. PATENT DOCUMENTS

2006/0169675 A1\* 8/2006 Hwang .................... B23H 9/10
                                                  219/69.17
2009/0211921 A1   8/2009 Platz et al.
2012/0103830 A1\* 5/2012 Platz ........................ B23H 3/00
                                                  205/686

\* cited by examiner

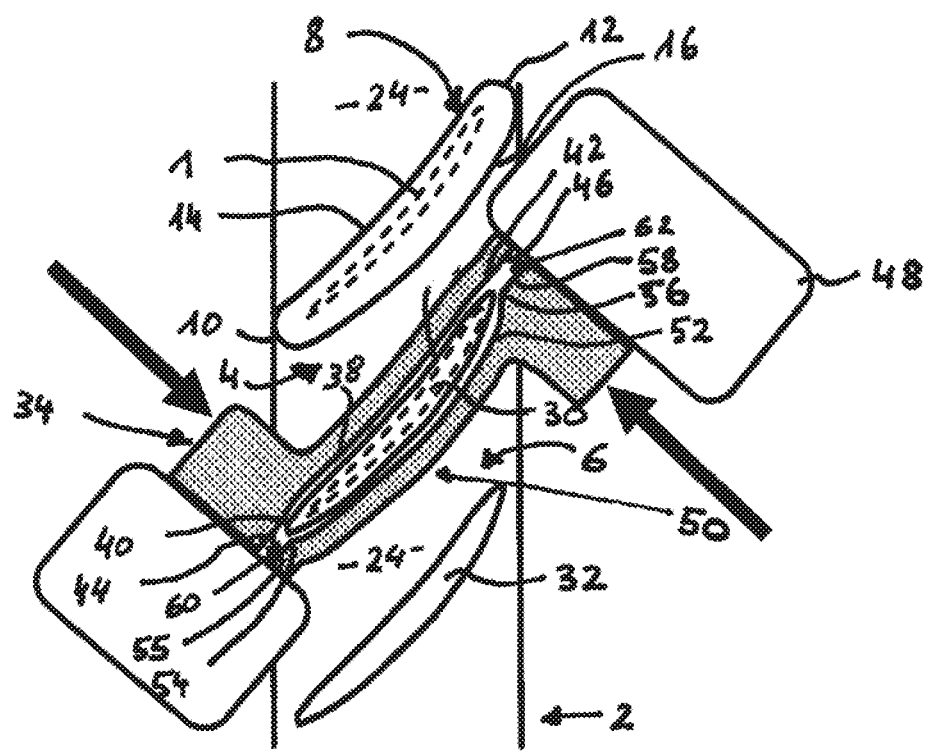

DEVICE AND METHOD FOR PRODUCING A BLADE AIRFOIL

CROSS-REFERENCE TO RELATED APPLICATIONS

The present application claims priority under 35 U.S.C. § 119 of German Patent Application No. 102015216844.1, filed Sep. 3, 2015, the entire disclosure of which is expressly incorporated by reference herein.

BACKGROUND OF THE INVENTION

1. Field of the Invention

The invention relates to a method for producing a blade airfoil to a device for producing a blade airfoil.

2. Discussion of Background Information

In the production of stator blades, as are used in stator rings of gas turbines, and rotor blades, as are used in BLISKs (bladed integrated disks) and BLINGs (bladed rings) in stationary or nonstationary gas turbines, important factors are the costs, the production rate and the compliance with given tolerances, without producing too much scrap in the process. In this case, the blades or blade airfoils can be produced by mechanical machining, such as milling, or by electrochemical machining.

In particular, electrochemical machining (ECM) methods have advantages compared with mechanical machining for particular materials such as nickel-based alloys, for example.

It is known practice to machine sections of the blades using the ECM method. Thus, all the faces of the blade airfoil are milled to a final contour, with only the edges being brought to their final contour by the ECM method. This has the drawback that the speed potential of the ECM method is not fully exploited.

It is also known for the leading and/or trailing edges of cast blades to be finished by means of ECM.

U.S. Pat. No. 4,851,090, the entire disclosure of which is incorporated by reference herein, discloses an ECM method. In that case, the blade airfoil is arranged between two electrodes. The electrolyte is passed from the rear edge of the blade airfoil over the front edge of the blade airfoil. However, this has the drawback that the base and the top of the blade airfoil cannot be machined thereby. Only the suction side and pressure side of the blade airfoils can be machined thereby.

In view of the foregoing, it would be advantageous to have available a device and a method for producing a blade airfoil, which overcomes the above drawbacks and thus allows the base and the top of the blade airfoil to be machined.

SUMMARY OF THE INVENTION

The present invention provides a method for producing a blade airfoil from a workpiece which comprising at least two gaps and at least one blank arranged between the two gaps of the workpiece, which blank comprises first and second opposite lateral faces which are bounded by a base, by a top and by a first and a second edge. The method comprises:

(a) arranging a first electrode in the first gap and arranging a second electrode in the second gap, the surface of the workpiece forming an annular space surface at the first and second gaps, (b) applying a positive voltage to the blank and applying a negative voltage to the first and second electrodes, c) moving the first electrode in the direction of the first lateral face and/or moving the second electrode in the direction of the second lateral face.

Further, (b) is preceded by (d), i.e., passing electrolyte between the two electrodes over the top toward the base.

In one aspect of the method, the two gaps of the annular space surface may be produced by mechanical and/or electrochemical machining.

In another aspect, an intermediate blade may be created from the blank by carrying out (a) to (d), said intermediate blade having substantially a regular oversize in at least one region of the blade airfoil compared with a nominal contour of the blade airfoil. The region which has the regular oversize in at least one region of the blade airfoil compared with a nominal contour of the blade airfoil may be the first and/or second of the blade airfoil and/or may be the first and/or the second edge of the blade airfoil.

In yet another aspect of the method, the nominal contour of the blade airfoil and/or the nominal contour of an annular space may be created from an intermediate part in the vicinity of the base by carrying out (a) to (d). The intermediate part may represent the blank and/or the intermediate blade. Further, (c) may be followed by (e), i.e., moving the first electrode away from the first lateral face and/or moving the second electrode away from the second lateral face. For example, steps (c) and (e) may be repeated up to (and at least) 30 times, in particular up to (and at least) 50 times, per second.

The present invention also provides a device for producing a blade airfoil from a workpiece, and in particular, a device which is suitable for carrying out the above method. The device comprises:

a first electrode, a second electrode, a voltage source, the negative pole of which is attached to the two electrodes, at least one of the two electrodes having a receptacle for a blank, the receptacle being bounded by a front receptacle edge and a rear receptacle edge.

Further, at least one of the first and second electrodes has at its upper end a filling face which leads into the receptacle and extends at least from the front receptacle edge to the rear receptacle edge.

In one aspect of the device, the first electrode may be guided through a first element and/or the second electrode may be guided through a second element, each of which is arranged laterally with respect to the guiding direction of the corresponding electrode.

In another aspect, at least one electrode may form, with its corresponding element, at least one flushing channel extending parallel to the receptacle edge, said flushing channel being arranged outside the receptacle.

In yet another aspect, the device may further comprise at least one isolator which is arranged on that side of the electrode that faces away from the receptacle and/or extends from one electrode to the element of the other electrode.

In a still further aspect, a lower end of the first and/or second electrode may be formed such that it produces the nominal contour of the annular space.

The present invention also provides a blade airfoil of a turbomachine, produced by a method as set forth above.

As set firth above, the invention relates to a method for producing a blade airfoil from a workpiece having at least two gaps and at least one blank, arranged between the two gaps, of the workpiece. The blank has two opposite lateral faces which are bounded by a base, by a top and by a first and a second edge. In method step a) according to the invention, a first electrode is arranged in the first gap and a second electrode is arranged in the second gap. In step b), a positive voltage is applied to the blank and a negative voltage is applied to the first electrode and to the second electrode. In step c), the first electrode is moved in the direction of the first lateral face. Alternatively or in combination therewith, the second electrode is moved in the direction of the second lateral face in step c). According to the invention, step b) is preceded by a step d) in which electrolyte is passed or electrolyte flows between the two electrodes over the top toward the base.

A base should be understood as being the region of the blade airfoil which merges into the rest of the workpiece or is connected to a ring or a disk. In this case, the top of the blade airfoil is arranged opposite the base and forms a free end. The blade airfoils extend in this case substantially radially to the circular path of the component (such as ring or disk). The feed directions of the electrodes can extend parallel to one another. This method according to the invention has the advantage that not just the lateral faces of the blade airfoil but also the top and base of the blade airfoil can be machined at the same time.

In order to be able to place the electrodes in the gaps, the workpiece should be prepared. Therefore, both gaps are preferably produced by mechanical machining, in particular by milling, and/or by electrochemical machining. Typically, all of the gaps are carved out of the workpiece. This method step is also referred to as the premachining and/or roughing process. If a blisk has for example 38 blade airfoils, the same number of gaps are necessary.

In a further advantageous embodiment of the invention, by way of steps a) to d), an intermediate blade is created from the blank, said intermediate blade having substantially a regular oversize in at least one region of the blade airfoil compared with a nominal contour of the blade airfoil. Preferably, the region represents the first and/or second side of the blade airfoil. This can be for example the pressure side and/or suction side of the blade airfoil. Present between that surface of the blank that is to be machined and the electrode surface is a gap which is referred to as a lowering gap. In this case, the lowering gap is dependent on the solid angle which is defined between the infeed direction and the surface normals of the electrode. If the solid angle is less than 30°, the gap is known as an end gap. Starting from a solid angle of 50°, the gap is known as a side gap. In a side gap, it is possible for too much material to be machined away in an undesired and uncontrolled manner.

In a further advantageous embodiment of the invention, the region represents the first and/or second edge of the blade airfoil. This has the advantage that the edges can be produced very precisely. In this case, the electrodes can be moved toward the edges in order to avoid undesired side gaps. This is also referred to as edge machining.

In a further advantageous embodiment of the invention, by way of steps a) to d), the nominal contour of the blade airfoil and/or the nominal contour of an annular space is created from an intermediate part in the vicinity of the base. Preferably the intermediate blade is used as the intermediate part. This has the advantage that the annular space, i.e. the surface of the workpiece in the gaps between the blade airfoils is also machined at the same time. This is also referred to as finishing.

In a further advantageous embodiment of the invention, step c) is followed during finishing by a step e) in which the first electrode is moved away from the first lateral face and/or the second electrode is moved away from the second lateral face. In this case, steps c) and e) are preferably repeated up to about 30 times and in particular up to 50 times per second. This is also referred to as PECM (precise electrochemical machining). This has the advantage that, as a result of the electrode being moved away, spent electrolyte "saturated" with detached material is flushed more quickly out of the machining gap. During the movement of the electrode toward the lateral face, fresh electrolyte is fed into the gap. Energization takes place at the highest point of the infeed. As a result, short circuits can be avoided, and the gap between the electrode and the workpiece can turn out smaller such that the accuracy is increased as a result.

The invention also relates to a device for producing a blade airfoil having a profile thickness and a profile length from a workpiece. The device comprises a first electrode, a second electrode and a voltage source, the negative pole of which is attached to the two electrodes. At least one of the two electrodes has a receptacle for a blank, the receptacle being bounded by a front receptacle edge and a rear receptacle edge. In this case, at least one electrode has at its upper end a filling face which leads into the receptacle and extends at least from the front receptacle edge to the rear receptacle edge. This has the advantage that not just the faces but also the top and the base of the blade airfoil can be machined by the device. The upper end of the electrode is arranged at the free end of the blank or of the blade airfoil during machining, such that the electrolyte can flow from the top over the lateral face as far as the base of the blade airfoil.

In one advantageous embodiment of the invention, the first electrode is guided through a first element and/or the second electrode is guided through a second element, each of which is arranged laterally with respect to the guiding direction of the corresponding electrode. This has the advantage that the electrodes can be moved in precisely predetermined directions. In combination therewith or alternatively thereto, the elements prevent the electrolyte from flowing away laterally.

In a further advantageous embodiment of the invention, at least one electrode forms at least one flushing channel extending parallel to the receptacle edge, said flushing channel being arranged outside the receptacle. This has the advantage that the spent electrolyte can be transported away outside the machining area. In particular, material is detached at the blade top. This detached material would then have to flow over the entire lateral face. The closer to the base, the more detached material collects and the risk of a short circuit would increase. A short circuit should be avoided, since then the workpiece has to be treated as scrap.

In a further advantageous embodiment of the invention, the device has at least one isolator which is arranged on that side of the electrode that faces away from the receptacle and/or extends from one electrode to the element of the other electrode. If a plurality of blade airfoils are intended to be produced, these are machined in succession. In order that the blanks or the intermediate blades or the final blades, which are adjacent to the blades to be machined, are not undesirably machined, it is necessary to avoid an electric potential building up between the parts that are not to be machined and the electrodes. This in particular avoids material being machined away on adjacent blades.

In a further advantageous embodiment of the invention, a lower end of the electrode is formed such that the nominal contour of the annular space is producible. This has the advantage that both the surface of the blade airfoil and the surface of the workpiece can be machined simultaneously. In particular, for aerodynamic reasons, the surfaces of the workpiece between the blade airfoils are no longer cylindrical or conical. Instead, the intermediate surface of the workpiece has hills and valleys, this also being referred to as a contoured annular space. The lower end is thus understood as being the end of the electrode which is arranged in the vicinity of the base during machining.

Further advantageous embodiments of the invention are set forth in the dependent claims.

BRIEF DESCRIPTION OF THE DRAWINGS

Preferred exemplary embodiments of the invention are described in more detail in the following with reference to the schematic drawings, in which:

FIG. 2: shows a plan view of intermediate machining according to the invention,

FIG. 3: shows a plan view of the edge machining according to the invention,

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
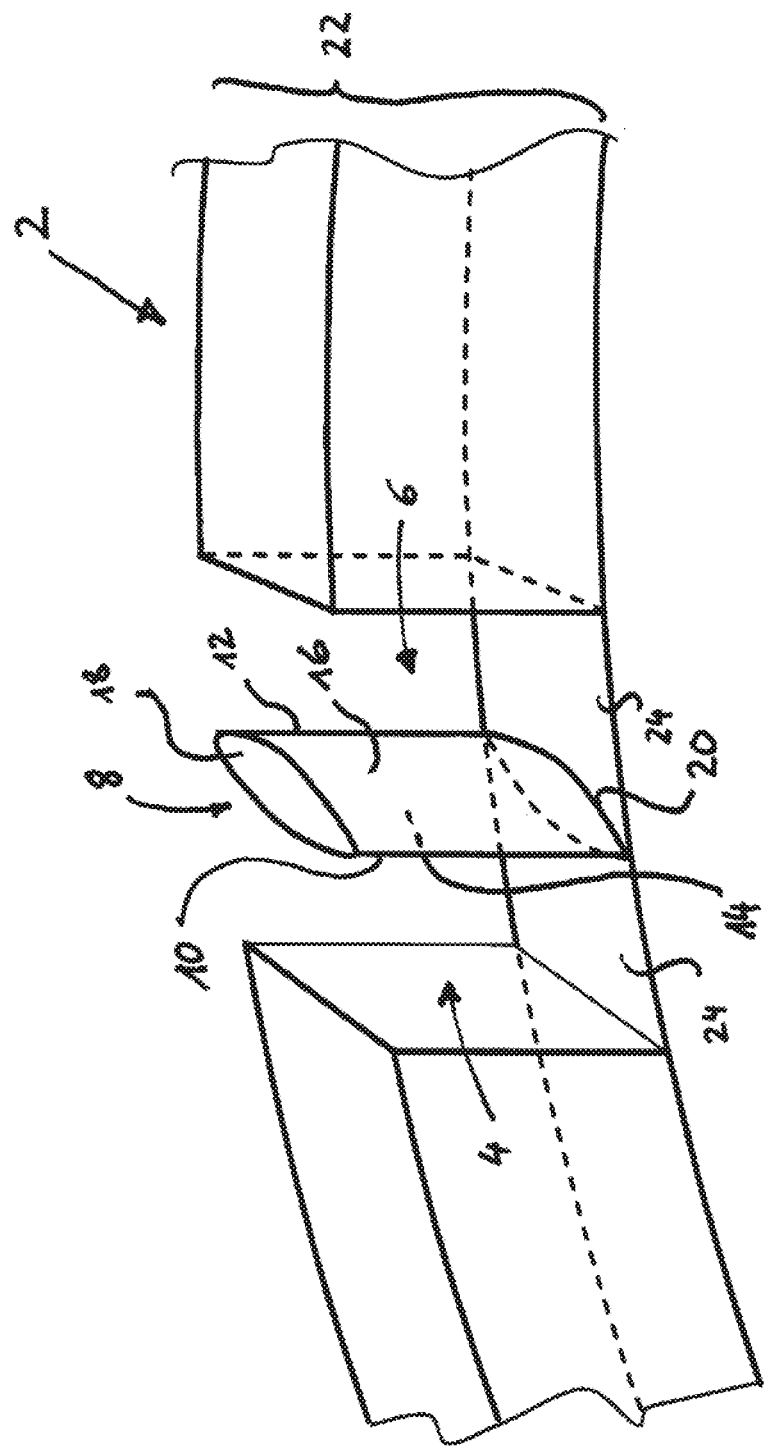
FIG. 1: shows a perspective view of a workpiece.

FIG. 1 shows a perspective view of a workpiece 2. This can be for example a disk or a ring. Sections are also possible, i.e. including segments of the above-described parts. A first gap 4 and a second gap 6 have been carved out of the material of the workpiece 2 by mechanical or electrochemical machining. A blank 8 is arranged between the two gaps. The blank 8 has a first edge 10 (for example front edge or leading edge), a second edge 12 (for example rear edge or trailing edge), a first lateral face 14 (for example a pressure side), which extends from the first 10 to the second 12 edge, and a second lateral face 16 (for example a suction side), which likewise extends from the first 10 to the second 12 side. The free end of the blank 2 is referred to as the top or tip 18. In this case, the top 18 is directed radially outward. For a stator ring, this top would be directed radially inward. The blank has a base 20 in the direction of the region opposite the top 18, said base 20 merging seamlessly into the workpiece 2. The surface of the workpiece 2 at the gaps 4 and 6 is referred to as the annular space surface 24. Further blanks 8 can be carved out of the in this case outer radial peripheral region 22 of the workpiece 2.

Figure 4:
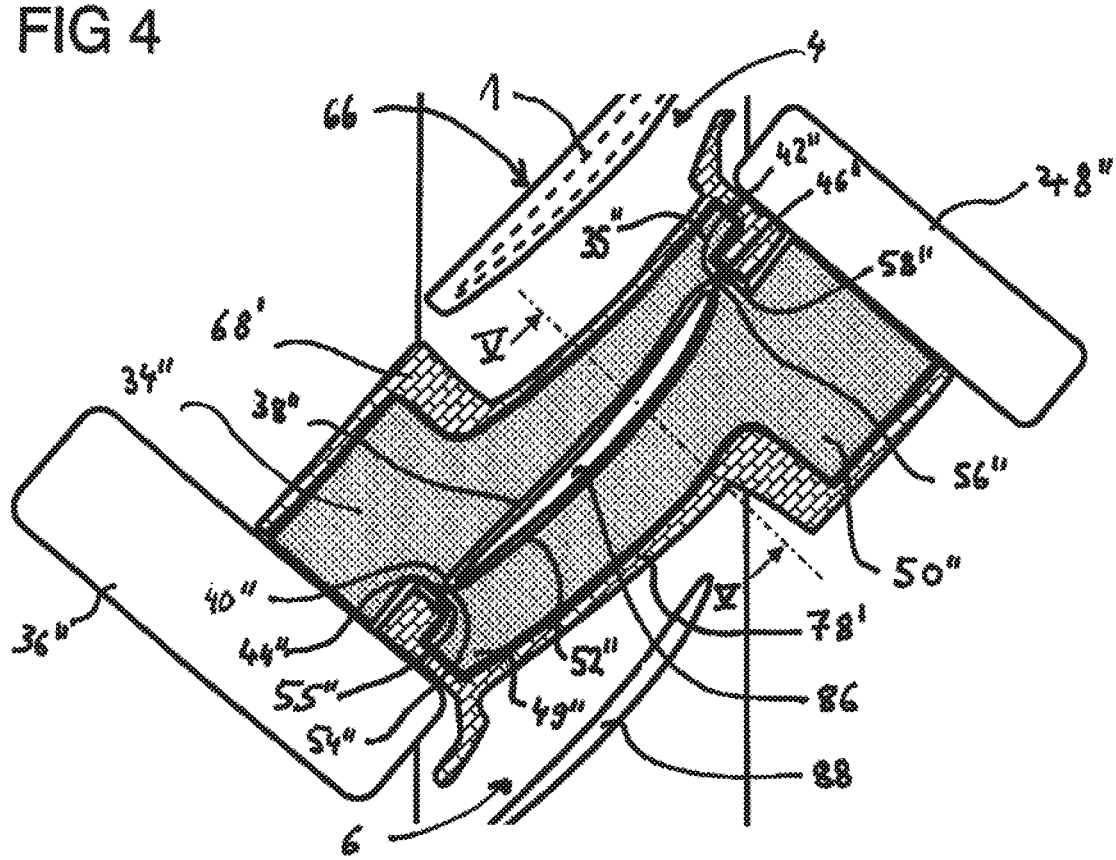
FIG. 4: shows a plan view of the finishing according to the invention.

A total of three blades have been illustrated in FIGS. 2 to 4. Of course, there could also be more, for example 39 blades.

FIG. 2 shows a plan view of the intermediate machining according to the invention. For a clearer illustration, the circumferential face of the workpiece together with the blanks 8 has been developed; the workpiece 2 extends from top to bottom. Depicted on the surface of the workpiece 2 are a blank 8, an intermediate blade 30 that is being machined, and a finished intermediate blade 32. The nominal contour 1 of the blade airfoil has been drawn by way of dashed lines in the blank 8. A first electrode 34 according to the first embodiment is arranged in the first gap 4 between the blank 8 and the intermediate blade 30 that is being machined. This first electrode 34 has a first receptacle 38 which extends from the first front receptacle edge 40 to the first rear receptacle edge 42. The first receptacle 38 thus represents corresponding contouring of the first electrode surface, in which an intermediate blade 30 is machined. Following the first front receptacle edge 40, a first front flushing face 44 of the first electrode 34 extends as far as a first element 36. This element can be a guide element or a flushing chamber. Following the first rear receptacle edge 42 a first rear flushing face 46 of the first electrode 34 extends as far as a second element 48. This element can be a guide element or a flushing chamber.

A second electrode 50 is arranged in the second gap 6 between the finished intermediate blade 32 and the intermediate blade 30 that is being machined. This second electrode 50 has a second receptacle 52 which extends from the second front receptacle edge 54 as far as a second rear receptacle edge 56. The second receptacle 52 thus represents corresponding contouring of the second electrode surface, in which an intermediate blade 30 is machined. Following the second front receptacle edge 54, a second front flushing face 55 of the second electrode 50 extends as far as a first element 36. Following the second rear receptacle edge 56, a second rear flushing face 58 of the second electrode 50 extends as far as a second element 48. The intermediate blade 30 that is being machined is arranged in the first receptacle 38 and in the second receptacle 52. The first receptacle 38, or the face thereof, is spaced apart from the first lateral face 14 of the intermediate blade 30, i.e. arranged in a spaced-apart manner therebetween. Likewise, the second receptacle 52, or the face thereof, is spaced apart from the second lateral face 16 so that electrolyte can flow from the top 18 to the base 20. The two electrodes 34 and 50 are moved toward one another along the two arrows and can in this case be guided laterally by the two elements 36 and 48. In this case, the first element 36, the first front flushing face 44 and the second front flushing face 55 form a front flushing channel 60. Furthermore, the second element 48, the first rear flushing face 46 and the second rear flushing face 58 also form a rear flushing channel 62.

The two electrodes 34 and 50 extend from the first element 36 to the second element 48.

As can be seen, the first edge 10 is directed into the front flushing channel 60. In addition, the second edge 12 is directed into the rear flushing channel 62.

Therefore, the lateral faces 14 and 16 are preferably machined during this intermediate machining. The electrodes 34 and 50 are in the end position in FIG. 2, i.e. the electrodes 34 and 50 are no longer pushed together. The electrolyte flows into the plane of the airfoil. Spent electrolyte can then also flow along into the front and rear flushing channels 60 and 62.

FIG. 3 shows a plan view of the edge machining according to the invention. Preferably the edges 10 and 12 are intended to be machined thereby. For clearer illustration, the circumferential face of the workpiece 2 together with the intermediate blades 32 has been developed. The workpiece 2 extends from top to bottom. Depicted on the surface of the workpiece 2 are an intermediate blade 32, an edge blade 64 that is being machined, and a finished edge blade 66. The nominal contour 1 of the blade airfoil is drawn by way of dashed lines in the blades 32, 64 and 66.

A first electrode 34' according to the second embodiment is arranged in the first gap 4 between the intermediate blade 32 and the edge blade 64 that is being machined. This first electrode 34' has a first receptacle 38' which extends from the first front receptacle edge 40' as far as the first rear receptacle edge 42'. Following the first front receptacle edge 40', a first front flushing face 44' of the first electrode 34' extends as far as a first element 36'. In this case, the first front flushing face 44' extends substantially perpendicularly to the face of the first receptacle 38. This first electrode 34' is arranged opposite the front edge 10. The face of the first receptacle 38' extends substantially parallel to the guide face 37' of the first element 36'.

A second electrode 50' according to the second embodiment is arranged in the second gap 6 between the edge blade 66 and the edge blade 64 that is being machined. This second electrode 50' has a second receptacle 52' which extends from the second front receptacle edge 54' as far as the second rear receptacle edge 56'. Following the second rear receptacle edge 56', a second front flushing face 55' of the second electrode 50' extends as far as a second element 48'. In this case, the second front flushing face 55' extends substantially perpendicularly to the face of the second receptacle 52'. This second electrode 50' is arranged opposite the rear edge 12. The face of the second receptacle 52' extends substantially parallel to the guide face 47' of the second element 48'.

Arranged in the first receptacle 38' is a first isolator 68, which extends as far as a second element 48'. The isolator 68 has essentially three regions. The central region 70 extends substantially parallel to the first lateral face 14. The holding region 72 extends substantially perpendicularly to the central region 70 and is fastened in the first receptacle 38'. The third region is a flushing region 74 which is arranged in the vicinity of the second element 48' and opposite the second front flushing face 55'. In this case, the flushing region 74, the second front flushing face 55' and the guide face 47' form a second flushing channel 62'.

Arranged in the second receptacle 52' is a second isolator 78, which extends as far as a second element 36'. The isolator 78 has essentially three regions. The central region 80 extends substantially parallel to the second lateral face 16. The holding region 82 extends substantially perpendicularly to the central region 80 and is fastened in the first receptacle 52'. The third region is a flushing region 84 which is arranged in the vicinity of the first element 36' and opposite the first front flushing face 44'. In this case, the flushing region 84, the first front flushing face 44' and the guide face 37' form a first flushing channel 60'.

During this edge machining, preferably the edges 10 and 12 are machined. The electrodes 34' and 50' are in the end position in FIG. 3, i.e. the electrodes 34' and 50' are not pushed closer together. The electrolyte flows into the plane of the airfoil. In this case, spent electrolyte can flow a ally into the front and rear flushing channels 60' and 62'.

Figure 5:
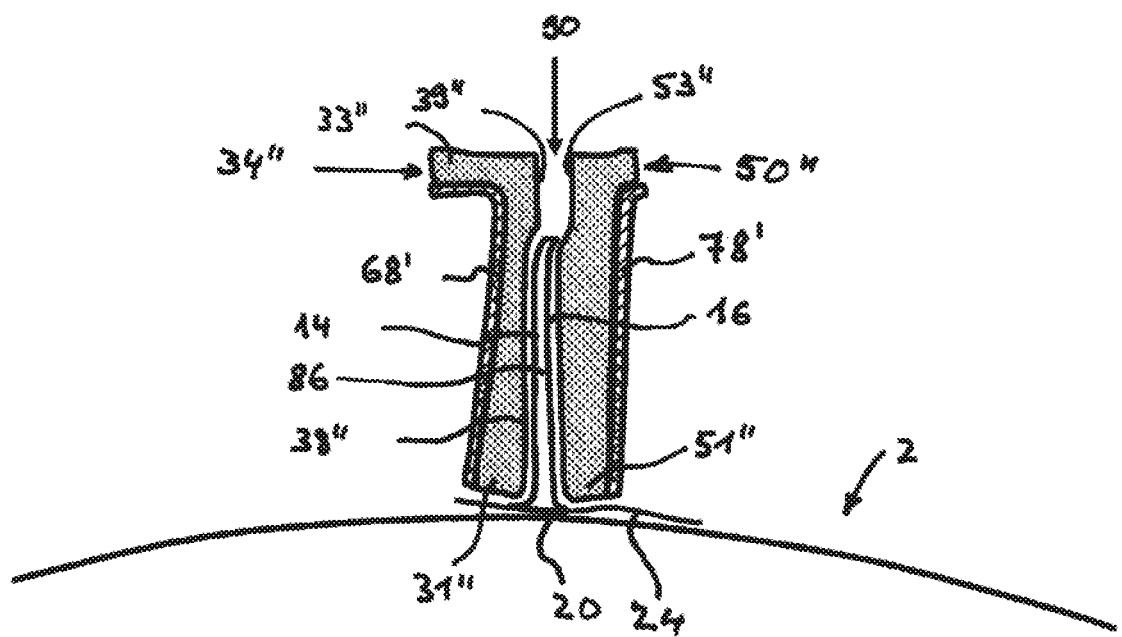
FIG. 5: shows a section alone the line V-V in FIG. 4.

FIG. 4 shows a plan view of the finishing according to the invention. FIG. 5 shows a section along the line V-V in FIG. 4, which extends through the two electrodes, the two isolators and the end blade to be machined. For clearer illustration, the circumferential face of the workpiece 2 together with the blades located thereon has been developed. The workpiece extends from top to bottom. Depicted on the surface of the workpiece 2 in FIG. 4, here, are a finished edge blade 66, an end blade 86 that is being machined and a finished end blade 88. The nominal contour 1 of the blade airfoil has been drawn by way of dashed lines in the edge blade 66. It should be noted here that the finished end blade 88 has the nominal contour 1.

Arranged in the first gap 4 between the edge blade 66 and the end blade 86 that is being machined is a first electrode 34" according to the third embodiment having a first isolator 68' according to the second embodiment. This first electrode 34" has a first receptacle 38", which extends from the first front receptacle edge 40" as far as the first rear receptacle edge 42". The first receptacle 38" can be subdivided into three regions. The first region in this case covers the first leading-edge region. The 2U second region in this case covers the pressure side region of the blade. The third region in this case covers the first trailing edge region. Following the first front receptacle edge 40", a first front contact face 44" is integrally formed in the direction of the first element 36". The first electrode 34" extends in an offset manner thereto as far as the first element 36". Following the first rear receptacle edge 42", a first rear contact face 46" of the first electrode 34" is integrally formed in the direction of a second element 48". A first isolator 68' is arranged on that side of the first electrode 34" that faces away from the first receptacle 38". This first isolator 68' extends from the first element 36" as far as the second element 48", wherein the first isolator 68' embraces the rear end 35" of the first electrode 34". Thus, the first electrode 34" is not in direct contact with the second element 48".

Arranged in the second gap 6 between the finished end blade 88 and the end blade 86 that is being machined is a second electrode 50" according to the third embodiment having a second isolator 78' according to the second embodiment. This second electrode 50" has a second receptacle 52", which extends from the second front receptacle edge 54" as far as the second rear receptacle edge 56". The second receptacle 52" can likewise be subdivided into three regions. The first region in this case covers the second leading edge region. The second region in this case covers the suction side region of the blade. The third region in this case covers the second trailing edge region. Following the second front receptacle edge 54", a second front contact face 55" is integrally formed in the direction of the first element 36". Following the second rear receptacle edge 56", a second rear contact face 58" of the second electrode 50" is integrally formed in the direction of a second element 48". The second electrode 50" extends in an offset manner thereto as far as the second element 48".

A second isolator 78' is arranged on that side of the second electrode 50" that faces away from the second receptacle 52". This second isolator 78' extends from the first element 36" as far as the second element 48", wherein the second isolator 78' embraces the front end 49" of the second electrode 50". Thus, the second electrode 50" is not in direct contact with the first element 36". Furthermore, the two first regions of the two receptacles 38" and 52" are formed such that the leading edge 12 has the final desired contour after finishing. Furthermore, the two third regions of the two receptacles 38" and 52" are formed such that the trailing edge 10 has the final desired contour after finishing. Thus, not just the suction and pressure faces are machined, but also the edges 10 and 12 can be machined at the same time.

During machining, the electrodes 36" and 50" are moved toward and away from the blade 86. The movement frequency can be up to 50 Hz. In this case, the first front contact face 44" and the second front contact face 55" come into contact. The first rear contact face 46" and the second rear contact face 58" also come into contact, as is depicted in FIG. 4. It should be noted that no flushing channels are present here. The oscillating movement of the electrodes 36" and 48" effects the flushing.

FIG. 5 shows the direction of flow of the electrolyte. The first electrode 34" is extended in the upper region above the first receptacle 38" by a first filling face 39". The second electrode 50" is extended in the upper region above the second receptacle 52" by a second filling face 53". The two filling faces 39" and 53" form a filling channel 90. Via this filling channel 90, which extends from the first edge 10 to the second edge 12, electrolyte is fed in, and then passes out at the level of the base 20 in the annular space 24. Thus, the entire blade top 18, the side faces 14 and 16 and the edges 10 and 12 are wetted with electrolyte.

It should be noted that the lower end 31" of the first electrode 34" and the lower end 51" of the second electrode 50" are formed such that the annular space contouring can take place in the same work step. Thus, the electrolyte flows from the top 18 of the blade over the side faces 14 and 16 and/or the edges 10 and 12 toward the base 20.

Finishing takes place preferably after edge machining. However, it should be emphasized that finishing can be applied directly to the blank 8 or to the intermediate blade 32.

Furthermore, the electrolyte, as depicted in FIG. 5 for finishing, flows in the same way for intermediate and/or edge machining.

Although the present invention has been described in detail with the aid of the exemplary embodiments, it is clear to the person skilled in the art that the invention is not restricted to these exemplary embodiments, but rather that variants are possible in that individual features may be omitted or other combinations of features may be implemented, so long as the protective scope of the appended claims is not departed from. The present disclosure also includes all combinations of the individual features proposed.

LIST OF REFERENCE NUMBERS

1 Nominal contour
2 Workpiece
4 First gap
6 Second gap
8 Blank
10 First edge
12 Second edge
14 First lateral face
16 Second lateral face
18 Top
20 Base
22 Peripheral region of 2
24 Annular space surface
30 Intermediate blade
31 Lower end of 34
32 Finished intermediate blade
33" Upper end of 34"
34, 34', 34" First electrode, 1st, 2nd, 3rd embodiment
35" Rear end of 34"
36, 36', 36" First element, 1st, 2nd, 3rd embodiment
37' Guide face of 36'
First receptacle
39" Filling face of 34"
40 First front receptacle edge
42 First rear receptacle edge
44, 44' First front flushing face, 1st, 2nd embodiment
44" First front contact face of 34"
First rear flushing face
46" First rear contact face of 34"
47' Guide face of 48'
48, 48', 48" Second element, 1st, 2nd, 3rd embodiment
49" Front end of 50"
50, 50', 50" Second electrode of 1st, 2nd, 3rd embodiment
51" Lower end of 50"
52 Second receptacle
53 Filling face of 50
54 Second front receptacle edge
55, 55' Second front flushing face, 1st, 2nd embodiment of 50 or 50'
55" Second front contact face of 50"
56 Second rear receptacle edge
58 Second rear flushing face
58" Second rear contact face
60 First flushing channel
62 Second flushing channel
64 Edge blade being machined
66 Finished edge blade
68, 68' First isolator, 1st, 2nd embodiment
70 Central region
72 Holding region
74 Flushing region
78, 78' Second isolator, 1st, 2nd embodiment
80 Central region
82 Holding region
84 Flushing region
86 End blade being machined
88 Finished end blade
90 Filling channel

What is claimed is:

1. A method for producing a blade airfoil from a workpiece, wherein the workpiece comprises at least a first gap and a second gap, and at least one blank arranged between the first and second gaps of the workpiece, the at least one blank having first and second opposite lateral faces which are bounded by a base, by a top and by a first edge and a second edge, and wherein the method comprises:
  (a) arranging a first electrode in the first gap and arranging a second electrode in the second gap, a surface of the workpiece forming an annular space surface at the first and second gaps,
  (b) applying a positive voltage to the blank and applying a negative voltage to the first electrode and to the second electrode,
  (c) moving the first electrode in a direction of the first lateral face and/or moving the second electrode in a direction of the second lateral face,
  (b) being preceded by (d), passing electrolyte between the first and second electrodes over the top toward the base; wherein by carrying out (a) to (d), an intermediate blade airfoil of predetermined dimensions is formed from the blank, said intermediate blade airfoil having substantially a regular oversize on at least the first edge and/or the second edge of the blade airfoil compared with a nominal contour of the blade airfoil to be produced, and wherein, in a separate subsequent process with steps (a) to (d), a blade airfoil which has the nominal contour of the blade airfoil to be produced is produced from the intermediate blade airfoil by removing the substantially regular oversize on at least the first edge and/or the second edge of the blade airfoil, the first and second electrodes used for producing the intermediate blade airfoil having a shape which is different from a shape of first and second electrodes used for the separate subsequent process by which the substantially regular oversize on at least the first edge and/or the second edge of the blade airfoil is removed.

2. The method of claim 1, wherein the first and second gaps of the annular space surface are produced by mechanical and/or electrochemical machining.

3. The method of claim 1, wherein by carrying out (a) to (d), a nominal contour of the blade airfoil and/or a nominal contour of an annular space is created from an intermediate part in a vicinity of the base.

4. The method of claim 3, wherein the intermediate part represents the blank and/or an intermediate blade.

5. The method of claim 4, wherein (c) is followed by (e), moving the first electrode away from the first lateral face and/or moving the second electrode away from the second lateral face.

6. The method of claim 5, wherein (c) and (e) are repeated at least 30 times per second.

7. The method of claim 5, wherein (c) and (e) are repeated at least 50 times per second.

8. The method of claim 3, wherein (c) is followed by (e), moving the first electrode away from the first lateral face and/or moving the second electrode away from the second lateral face.

9. The method of claim 8, wherein (c) and (e) are repeated at least 30 times per second.

10. The method of claim 8, wherein (c) and (e) are repeated at least 50 times per second.

11. The method of claim 1, wherein the workpiece is a ring.

12. The method of claim 1, wherein the workpiece is a disk.

* * * * *